Sept. 7, 1965    J. R. LEHN ETAL    3,204,890
HELICOPTER AND TOWED VEHICLE THEREFOR
Filed Dec. 5, 1963
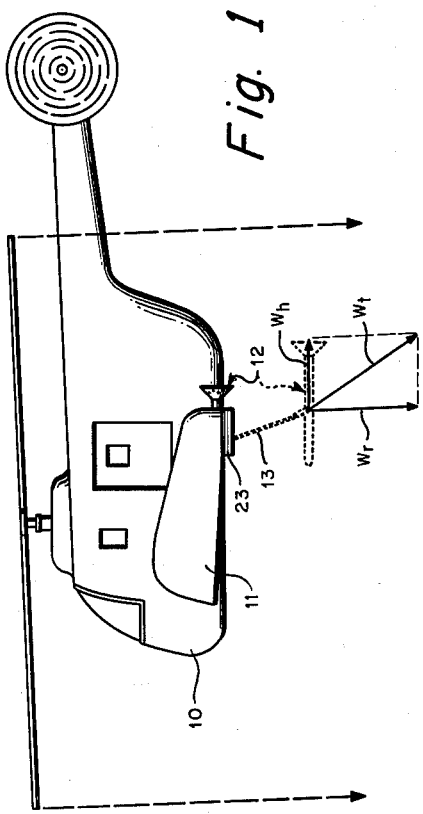
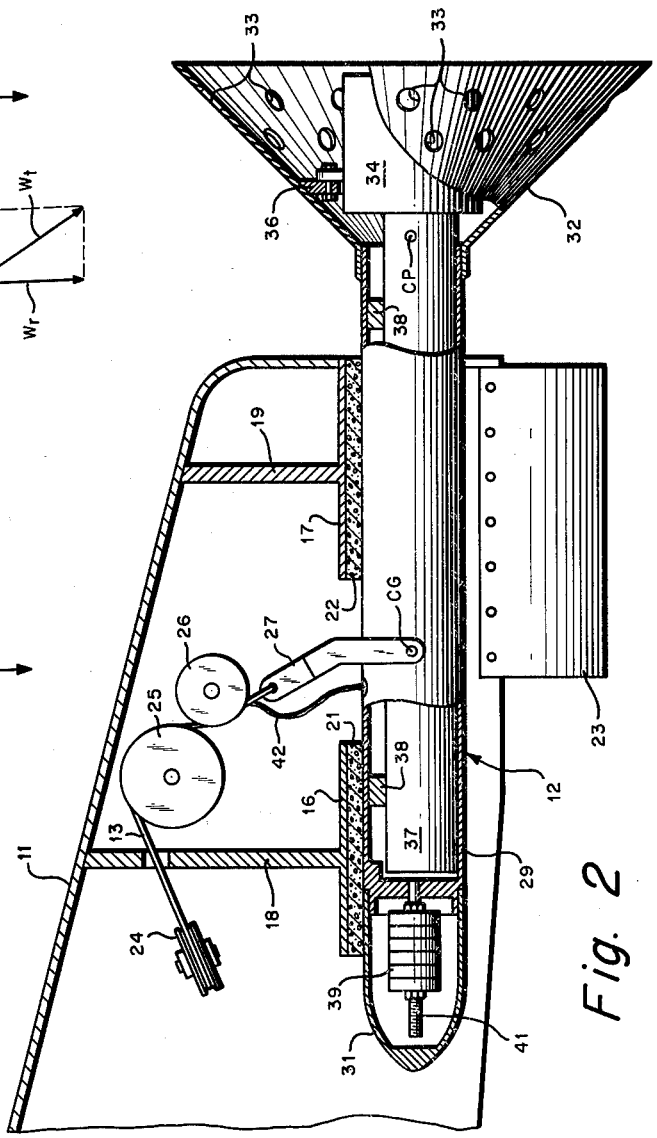
INVENTORS
JOHN R. LEHN
HAROLD M. TROXELL
ROBERT C. HELM
BY
ATTORNEY United States Patent Office 3,204,890
Patented Sept. 7, 1965

3,204,890
HELICOPTER AND TOWED VEHICLE THEREFOR
John R. Lehn, Huntingdon Valley, Pa., Harold M. Troxell, Burlington, N.J., and Robert C. Helm, Cheltenham, Pa., assignors to the United States of America as represented by the Secretary of the Navy
Filed Dec. 5, 1963, Ser. No. 328,436
6 Claims. (Cl. 244—3)
(Granted under Title 35, U.S. Code (1952), sec. 266)

The invention described herein may be manufactured and used by or for the Government of the United States of America for governmental purposes without the payment of any royalties thereon or therefor.

The present invention relates to a rotary-wing aircraft and towed vehicle combination which is aerodynamically stable under all conditions of flight, and more particularly to a helicopter and towed vehicle combination in which the vehicle remains aerodynamically stable at all speeds and at any tow cable payout length.

One technique for detecting underwater objects in the ocean involves a magnetic anomaly detection or MAD system in which a magnetometer-detector housed in an aerodynamic vehicle is towed from a fixed-wing search aircraft. Such a towed vehicle known in the prior art is described as a center of gravity towed nacelle with conventional stabilizing fins. Towed vehicles of this type, however, are dangerously unsuitable for use with a helicopter or other rotary-wing aircraft due to aerodynamic instability at low speeds between 25 and 100 knots, particularly when the towed vehicle is beneath or near the helicopter and is being subjected to both headwind from the forward motion and downwind from rotor downwash. The combined effect of these winds beneath the helicopter is usually turbulent and will vary depending upon the helicopter's forward speed and altitude. At low speeds and altitudes, the effect of rotor downwash becomes an increasingly important factor of consideration. For example, at the beginning of tow cable payout or at the end of its retrieval, the towed vehicle is subjected to the full force of rotor downwash and uncontrollable pendulous oscillations occur when conventional towed vehicles are used. At times the oscillations became so violent that the underside of the helicopter was pierced or torn by the towed vehicle. It was quickly apparent that conventional towed vehicles designed for use with fixed-wing aircraft were useless with rotary-wing aircraft.

Accordingly, it is an object of the present invention to provide a novel combination of rotary-wing aircraft and towed vehicle which is aerodynamically stable at low speeds in headwinds, downwinds, or a combination thereof; in which uncontrollable pendulous oscillations of the towed vehicle are reduced to substantially negligible significance; and in which the towed vehicle can be paid out and retrieved smoothly without damage to either the aircraft or the towed vehicle.

Another object of the invention is to provide an improved towed vehicle whose profile is aerodynamically suited for flight in both headwinds and downwinds; which is ideally suited for housing a magnetometer-detector; and which can be quickly and easily adjusted for variations in the center of gravity along the length of the vehicle.

Still another object of the invention is to provide an amphibious helicopter in which an improved sponson provides easy reception and positive securement of a towed vehicle.

A further object of the invention is to provide a relatively inexpensive towed vehicle which, exclusive of its payload, has only a few parts, which is capable of wide application and utility, which is relatively easy to manufacture and assemble, and which can be readily adapted to many varieties of rotary-wing aircraft and payloads.

Various other objects and advantages will appear from the following description of the invention, and the most novel features will be particularly pointed out hereinafter in connection with the appended claims.

In the accompanying drawing:

FIG. 1 is a pictorial representation of one embodiment of the invention, a towed vehicle being shown in solid outline in one position secured in the sponson of a helicopter, and in broken outline in another position depending from the helicopter by a relatively short length of tow cable; and FIG. 2 represents an enlarged, partially cut away, view of the towed vehicle secured in the aft portion of the helicopter sponson.

In the illustrated embodiment of the invention, FIG. 1 shows a rotary-wing aircraft, such as an amphibious helicopter 10 with a pair of sponsons (only the port sponson 11 being visible in the drawing), for providing lateral stability in water and for housing retractable landing wheels. The aft portion of the port sponson 11 is modified in a manner to be described for receiving and securing a towed vehicle which is indicated generally by the numeral 12. A tow cable 13 which also comprises electrical conductors is connected at its trailing end to the center of gravity of the vehicle 12, the other end being wound on a reel secured in the helicopter 10. At short cable payout lengths when the towed vehicle is in the path of the rotor downwash, as shown in FIG. 1, the headwind and rotor downwash impart two component wind forces $W_h$ and $W_r$, respectively, on the towed vehicle 12. The resultant force $W_t$ is met by an equal and opposite reaction at the end of the tow cable 13. For higher forward speeds and longer tow cable payout lengths, the force $W_r$ diminishes as the force $W_h$ increases. At very long cable payout lengths, the vehicle 12 is completely out of the rotor downwash, and only the headwind force $W_h$ is felt by the vehicle 12. Of course, rotor downwash may continue to load a small portion of the cable 13 near the aircraft but that force may be neglected for purposes of this disclosure. The manner in which the variable forces $W_h$ and $W_r$ are accounted for in the illustrated embodiment is best explained with reference to FIG. 2.

In FIG. 2, the aft portion of the port sponson 11 supports two inverted saddles 16 and 17 arranged in tandem and secured to the sponson 11 by convenient supporting structure such as bulkheads 18 and 19, respectively. The saddles 16 and 17 coaxially aligned have semi-cylindrical surfaces opening downward and lined on the lower surfaces with a resilient, shock absorbing cushion 21 and 22, such as an elastic polymer foam. The aft portion of the sponson 11 is continuously open on the underside for admitting and securing the towed vehicle 12 in an attitude substantially corresponding to that of the helicopter 10. A pair of laterally opposed guide plates 23, only one being shown in FIG. 2, extend outward and downward from the sponson opening for guiding the vehicle 12 into the sponson 11 just before it seats in the saddles 16 and 17.

The tow cable 13 is stored on a reel mounted in the fuselage of the helicopter 10 and feeds out through the port side into the sponson 11 and around a plurality of sheaves 24, 25 and 26 rotatably mounted in the sponson 11 by any convenient means. The trailing end of the cable 13 is secured to the middle extension of a bridle 27 whose bifurcated ends are pivotally connected on opposite sides of the vehicle 12 on an axis normal to the length of the vehicle 12 and passing substantially through the towed vehicle's center of gravity (CG). The particular manner in which the cable reel is operated does not form a part of this invention and may be any conventional manual or motor-driven means.

The towed vehicle 12 comprises a hollow cylindrical midsection 29 having a coaxial, streamlined, hollow nose section removably secured to the forward end thereof, and a right frusto-conical drag skirt 32 coaxially secured at its small opening to the aft end of the midsection 29 and flaring out toward the rear. A plurality of openings 33 are formed in the drag skirt 32 for bleeding a portion of the airstream on the outside of the drag skirt 32 into the low-pressure region normally created during flight behind the drag skirt 32. This has the effect of reducing the trailing vortices which otherwise tend to produce turbulent forces on the drag skirt 32 and destabilize the entire vehicle 12.

The illustrated embodiment of the invention is specially adapted for use in a MAD system, and as such, the towed vehicle 12 must be constructed of lightweight, nonmagnetic materials so as not to interfere with measurement of the ambient magnetic field through which the towed vehicle 12 passes. A magnetometer-detector 34 of a cylindrical outer configuration is coaxially supported with the skirt 32 by an angular ring 36 secured therebetween. This mode of construction permits the midsection 29 of the vehicle 12 to be relatively slender for minimum drag even though the magnetometer-detector 34 is relatively large in diameter. The midsection 29 is therefore reserved entirely for the insertion of electronic components mounted in an inner cylindrical casing 37, the latter being secured at the rear end to the magnetometer-detector 34. The casing 37 is slightly smaller in diameter than the midsection 29 and is axially offset from the cylindrical axis of the midsection 29 so that it touches the inside, lower surface of the midsection 29 for the full length thereof. A space along the top between the upper surface of the casing 37 and the lower surface of the midsection 29 is thereby created, and a plurality of shims 38 are secured therebetween for maintaining a fixed position for the casing 37. A separation in the tow cable 13 of electrical conductors 42 at the bridle 27 provides power to the electrical components in the casing 37, and further provides detection information back to the helicopter.

The longitudinal position of the magnetometer-detector 34 in the vehicle 12 usually tends to shift the CG aftward along the length of the vehicle 12 toward its center of pressure (CP). In order to maintain the CG as far forward as possible from the CP, for maximum aerodynamic stability, an adjustable ballast 39 is secured by a longitudinally disposed bolt 41 extending from the forward end of the midsection 29 into the nose section 31. The adjustable ballast 39 also compensates for slight variations in weight distribution of the electronic components in the cylinder 37 and for different size drag skirts.

The many advantages obtained by the present invention should now be apparent. For example, a helicopter and towed vehicle combination has been made possible whereby wide variations in headwind and downwind forces applied to a towed vehicle due to forward motion and rotor downwash have little disturbing effect on the aerodynamic stability of the towed vehicle irrespective of the amount of tow cable payout length. Violent, uncontrolled pendulous oscillations of the towed vehicle have been eliminated or reduced to the extent that no damage from oscillations will result to the helicopter or the towed vehicle. It will be further noted that the particular towed vehicle profile is particularly suitable for use in a MAD system in that a very slender forward configuration is afforded even though the magnetometer-detector employed is somewhat larger. Furthermore, compensation for variations in weight distribution throughout the length of the towed vehicle have been provided by a very convenient ballast adjusting means in order to continue enjoying all of the advantages of the center of gravity towing technique.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. An apparatus of the character described, the combination comprising:
   a rotary-wing aircraft;
   a tow cable secured at one end in said aircraft and adapted to be reeled out and trailed from said aircraft;
   a vehicle for towing in air including an elongated hollow cylinder, a streamlined hollow nose removably secured on one end of said cylinder, a frusto-conical drag skirt secured on the other end of said cylinder, and adjustable ballast means secured at said one end of said cylinder within said nose;
   a bifurcated bridle secured at the trailing end of said tow cable and pivotally connected at the center of gravity of said vehicle; and
   securing means fixed to said aircraft with said tow cable passing therethrough for orienting and securing said vehicle when said cable is fully retrieved into said aircraft, and said securing means including a pair of resiliently lined inverted saddies arranged in tandem and secured to rigid structure in said helicopter and fully exposed underneath.

2. An apparatus of the character described, the combination comprising:
   a rotary-wing aircraft;
   a tow cable secured at one end in said aircraft and adapted to be reeled out and trailed from said aircraft, said tow cable including a plurality of electrical conductors throughout its length for transmitting electrical power and intelligence therethrough;
   a vehicle for towing in air including an elongated hollow cylinder, a streamlined hollow nose removably secured on one end of said cylinder, a frusto-conical drag skirt secured on the other end of said cylinder with a plurality of holes formed therethrough around the periphery thereof, a magnetometer-detector coaxially secured within said drag skirt, a casing containing electronic components for operating with said magnetometer-detector secured within said cylinder, and adjustable ballast means secured at said one end of said cylinder within said nose;
   a bridle secured at the trailing end of said tow cable and pivotally connected at the center of gravity of said vehicle, said electrical conductors being electrically connected at the trailing end to the electrical components within said casing; and
   securing means fixed to said aircraft with said tow cable passing therethrough for orienting and securing said vehicle when said cable is fully retrieved into said aircraft, said securing means including a pair of resiliently lined inverted saddles arranged in tandem and secured to rigid structure in said helicopter and fully exposed underneath, and a pair of laterally opposed guide plates extending outward and downward from said saddles for guiding the vehicle just before it seats in said saddles.

3. An apparatus of the character described, the combination comprising:
   an amphibious helicopter having sponsons;
   a tow cable secured at one end in said aircraft and adapted to be reeled out and trailed from said aircraft, said tow cable including a plurality of electrical conductors throughout its length for transmitting electrical power and intelligence therethrough;

a vehicle for towing in air including an elongated hollow cylinder, a streamlined hollow nose removably secured on one end of said cylinder, a frusto-conical drag skirt secured on the other end of said cylinder with a plurality of holes formed therethrough around the periphery thereof, a magnetometer-detector coaxially secured within said drag skirt, a casing containing electronic components for operating with said magnetometer-detector secured within said cylinder, and adjustable ballast means secured at said one end of said cylinder within said nose;

a bridle secured at the trailing end of said tow cable and pivotally connected at the center of gravity of said vehicle, said electrical conductors being electrically connected at the trailing end to the electrical components within said casing; and securing means mounted in one of said sponsons with said tow cable passing therethrough for orienting and securing said vehicle when said cable is fully retrieved into said aircraft, said securing means including a pair of resiliently lined inverted saddles arranged in tandem and secured to rigid structure in said helicopter and fully exposed underneath, and a pair of laterally opposed guide plates extending outward and downward from said one sponson for guiding the vehicle just before it seats in said saddles.

4. An apparatus of the character described, the combination comprising:
  a rotary wing aircraft;
  an elongated hollow cylinder;
  a retrievable trailing cable secured at one end in said aircraft and at the other end to said cylinder;
  a streamlined nose secured at one end of said cylinder; and
  a perforated frusto-conical drag skirt formed from a single sheet secured on the other end of said cylinder.

5. An apparatus of the character described, the combination comprising:
  a rotary-wing aircraft;
  an elongated hollow cylinder;
  a retrievable trailing cable secured at one end in said aircraft and at the other end to said vehicle;
  a streamlined hollow nose removably secured at one end of said cylinder;
  a frusto-conical drag skirt secured on the other end of said cylinder with a plurality of holes formed therethrough around the periphery thereof;
  adjustable ballast means secured at said one end of said cylinder within said nose section; and
  a bifurcated bridle adapted to be secured at the trailing end of a tow cable paid out from said aircraft and pivotally connected at the center of gravity of said vehicle.

6. An apparatus of the character described, the combination comprising:
  a rotary-wing aircraft;
  an elongated hollow cylinder;
  a retrievable trailing cable secured at one end in said aircraft and at the other end to said vehicle;
  a streamlined hollow nose removably secured at one end of said cylinder;
  a frusto-conical drag skirt secured on the other end of said cylinder with a plurality of holes formed therethrough around the periphery thereof;
  a magnetometer-detector coaxially secured within said drag skirt;
  a casing containing electronic components for operating with said magnetometer-detector secured within said cylinder; and
  adjustable ballast means secured at said one end of said cylinder within said nose section.

References Cited by the Examiner
UNITED STATES PATENTS

| | | | |
|---|---|---|---|
| 2,590,131 | 3/52 | Schonstedt | 244—3 |
| 2,595,074 | 4/52 | Guillow | 46—79 |
| 2,599,957 | 6/52 | Walker | 46—79 |
| 2,793,828 | 5/57 | Rohtest | 244—135 |
| 2,946,543 | 7/60 | Gordon et al. | 244—135 |
| 2,955,250 | 10/60 | Shaw et al. | 324—4 |
| 3,030,050 | 4/62 | Hagemann | 244—3 |
| 3,061,248 | 10/62 | Jones et al. | 102—4 X |
| 3,088,693 | 5/63 | Brown | 244—3 |
| 3,100,093 | 8/63 | McQuillen et al. | 244—3 |
| 3,119,576 | 1/64 | Nielsen | 244—1 |

FOREIGN PATENTS 1,300,922  7/62  France.

MILTON BUCHLER, *Primary Examiner.*

FERGUS S. MIDDLETON, *Examiner.*